(12) United States Patent
Rita et al.

(10) Patent No.: US 6,240,773 B1
(45) Date of Patent: Jun. 5, 2001

(54) MOTOR VEHICLE SPEED MONITORING SYSTEM

(76) Inventors: John Rita; Miki Rita, both of 1188 Bishop St. #1601, Honolulu, HI (US) 96813

( * ) Notice: Subject to any disclaimer, the term of this patent is extended or adjusted under 35 U.S.C. 154(b) by 0 days.

(21) Appl. No.: 09/270,251

(22) Filed: Mar. 15, 1999

(51) Int. Cl.$^7$ ................................................ G06F 13/00
(52) U.S. Cl. .......................... 73/118.1; 73/488; 73/489; 340/441
(58) Field of Search .................... 73/116, 117.2, 73/117.3, 118.1, 488, 489; 116/62.1, 62.2, 62.3, 62.4; 340/441, 466

(56) References Cited

U.S. PATENT DOCUMENTS

| | | | |
|---|---|---|---|
| 4,464,933 | * | 8/1984 | Santis . |
| 4,635,029 | * | 1/1987 | Yamada . |
| 4,853,856 | * | 8/1989 | Hanway . |
| 5,555,502 | * | 9/1996 | Opel . |
| 5,775,451 | * | 7/1998 | Hull et al. . |
| 6,009,355 | * | 12/1999 | Obradovich et al. . |

* cited by examiner

*Primary Examiner*—Eric S. McCall
(74) *Attorney, Agent, or Firm*—John D. Gugliotta

(57) ABSTRACT

A motor vehicle speed monitoring system is disclosed as a device to acquire and record the top speed obtained by a motor vehicle during each operating session. Such monitoring allows for the security that one's children, employees, valets, mechanics, or others entrusted with the care of a vehicle have not operated it above acceptable speed limits. The system digitally records the top speed of the vehicle every time it is started and keeps a log of the speed and the time and dates at which it occurred. The owner or authorized user may review the internal log by entering a password key into a keypad.

1 Claim, 4 Drawing Sheets

MOTOR VEHICLE SPEED MONITORING SYSTEM

BACKGROUND OF THE INVENTION

1. Field of the Invention

The present invention relates generally to speed monitoring systems and, more particularly, to a motor vehicle speed monitoring system.

2. Description of the Related Art

A search of the prior art did not disclose any patents that read directly on the claims of the instant invention; however, the following references were considered related:

| U.S. Pat. No. | Inventor | Issue Date |
| --- | --- | --- |
| 5,639,967 | Alexis | Jun. 17, 1997 |
| 5,581,464 | Woll, et al. | Dec. 3, 1996 |
| 5,074,144 | Krofchalk, et al. | Dec. 24, 1991 |
| 4,945,759 | Krofchalk, et al. | Aug. 7, 1990 |
| 4,853,856 | Hanway | Aug. 1, 1989 |
| 4,804,937 | Barbiaux, et al. | Feb. 14, 1989 |
| 4,093,939 | Mitchell | June 6, 1978 |

While some features disclosed within the related art are incorporated into this invention in combination, other elements are different enough as to make the combination distinguished over these, and other references. Consequently, a need has therefore been felt for an improved mechanism that provides a method and system of recording the ground speed of a motor vehicle for reviewing at a later time to verify operation of said motor vehicle.

SUMMARY OF THE INVENTION

It is therefore an object of the present invention to provide an improved motor vehicle speed monitoring system.

It is another object of the present invention to allow owners or caretakers of motor vehicles to review the operating parameters of their motor vehicles when not under their direct observation.

It is a feature of the present invention to encourage safe operating practices of others' motor vehicles by knowing that the owner or caretaker will be able to determine the maximum operating speed of the motor vehicle.

In accordance with a preferred embodiment, a motor vehicle speed monitoring system is a device that interfaces to a speed detection instrument to allow the recording of a motor vehicle speed in an unattended manner. Such monitoring allows for the security that one's children, employees, valets, mechanics, or others entrusted with the care of a vehicle have not operated it above acceptable speed limits. The system digitally records the top speed of the vehicle every time it is started and keeps a log of the speed and the time and dates at which it occurred. The owner or authorized user may review the internal log by entering a password key into a keypad.

An advantage of the present invention is that it is able to operate independent from the vehicle's battery.

Another advantage is that the electrical components operate the system automatically without the activation or even the knowledge of the driver.

DESCRIPTIVE KEY

| | | | |
| --- | --- | --- | --- |
| 10 | motor vehicle speed monitoring system | 45 | input keypad |
| | | 50 | numeric keys |
| 15 | electronics enclosure | 55 | clear key |
| 20 | engine compartment | 60 | enter key |
| 25 | motor vehicle | 65 | scroll control keys |
| 30 | passenger compartment | 70 | fuse |
| 35 | operating panel | 75 | ground connection |
| 40 | output display | 80 | power connection cable |
| 85 | power supply | 140 | third functional block |
| 90 | internal backup battery | 145 | fourth functional block |
| 95 | main processor unit | 150 | second operation block |
| 100 | display driver | 155 | fifth functional block |
| 105 | keyboard interface | 160 | sixth functional block |
| 110 | communication paths | 165 | third operational block |
| 115 | speed acquisition cable | 170 | seventh functional block |
| 120 | speed detection device | 175 | eighth functional block |
| 125 | first functional block | 180 | fourth operational block |
| 130 | first operation block | | |
| 135 | second functional block | | |

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
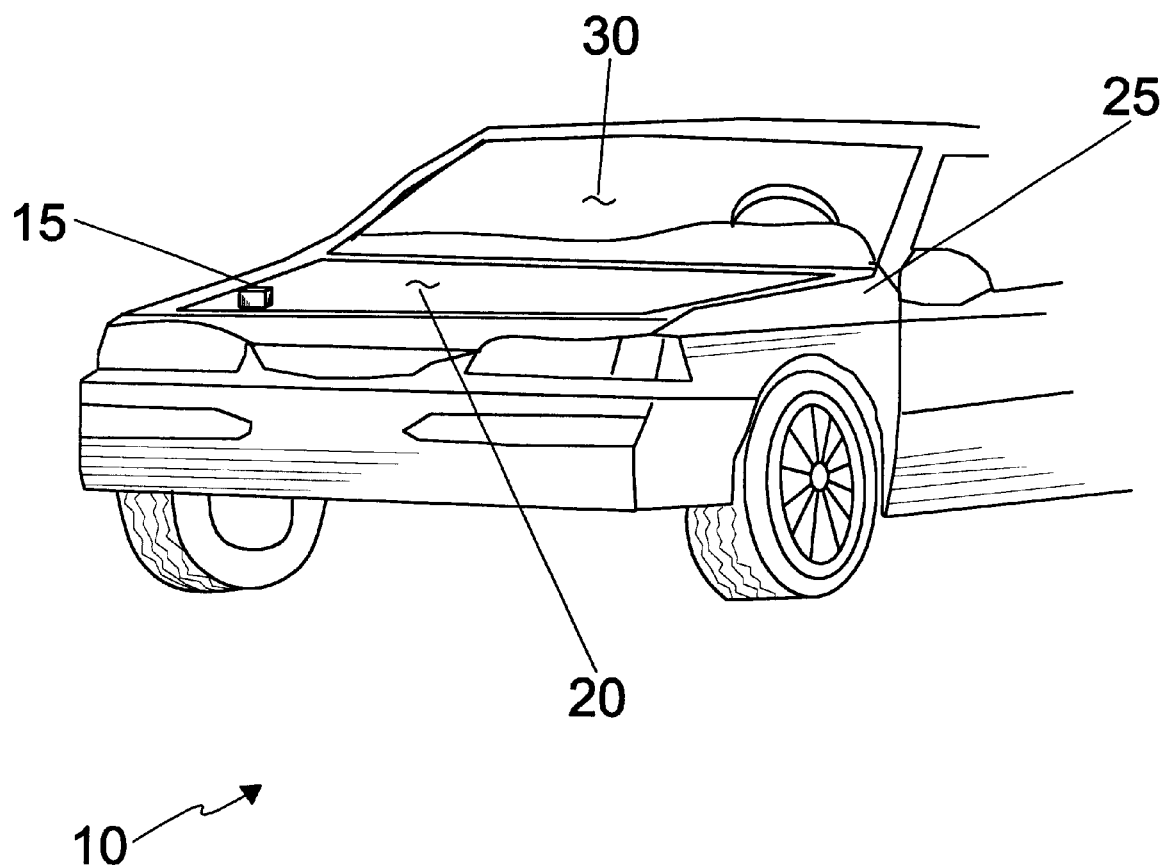
FIG. 1 is a perspective view of a motor vehicle speed monitoring system 10 shown in a utilized state on a motor vehicle according to the preferred embodiment of the present invention.

Referring now to FIG. 1, a motor vehicle speed monitoring system 10 is disclosed, according to the present invention. An electronics enclosure 15 is located within an engine compartment 20 of a motor vehicle 25. The hood of the motor vehicle 25, usually covering the engine compartment 20 has been omitted from this FIG. for purposes of clarity. The actual control components and the input/output interfaces associated with the electronics enclosure 15 will be described in greater detail herein below. The components utilized in the electronics enclosure 15 are suitable for the environment found inside an engine compartment 20, namely water resistant, heat resistant, cold resistant, and oil resistant. The electronics enclosure 15 may also be mounted in a passenger compartment 30 of the motor vehicle 25, in those instances where the functions of the motor vehicle speed monitoring system 10 would need to be accessed frequently and the knowledge of the motor vehicle speed monitoring system 10 by the driver of a motor vehicle 25 is not important. The only interconnecting components between the electronics enclosure 15 and the motor vehicle 25 is electrical wiring. Electrical wiring does not present limiting factors when used within the confines of a motor vehicle 25. It can also be seen by those familiar in the art, that the physical mounting location of the electronics enclosure 15 anywhere within the confines of the motor vehicle 25 is possible, and should not be considered a limiting factor of the present invention. The location of the electronics enclosure 15 within the engine compartment 20 of the motor vehicle 25, in addition to providing stealth properties, also aids in installation of the electronics enclosure 15 due to the ease of wiring connections within the engine compartment 20.

Figure 2:
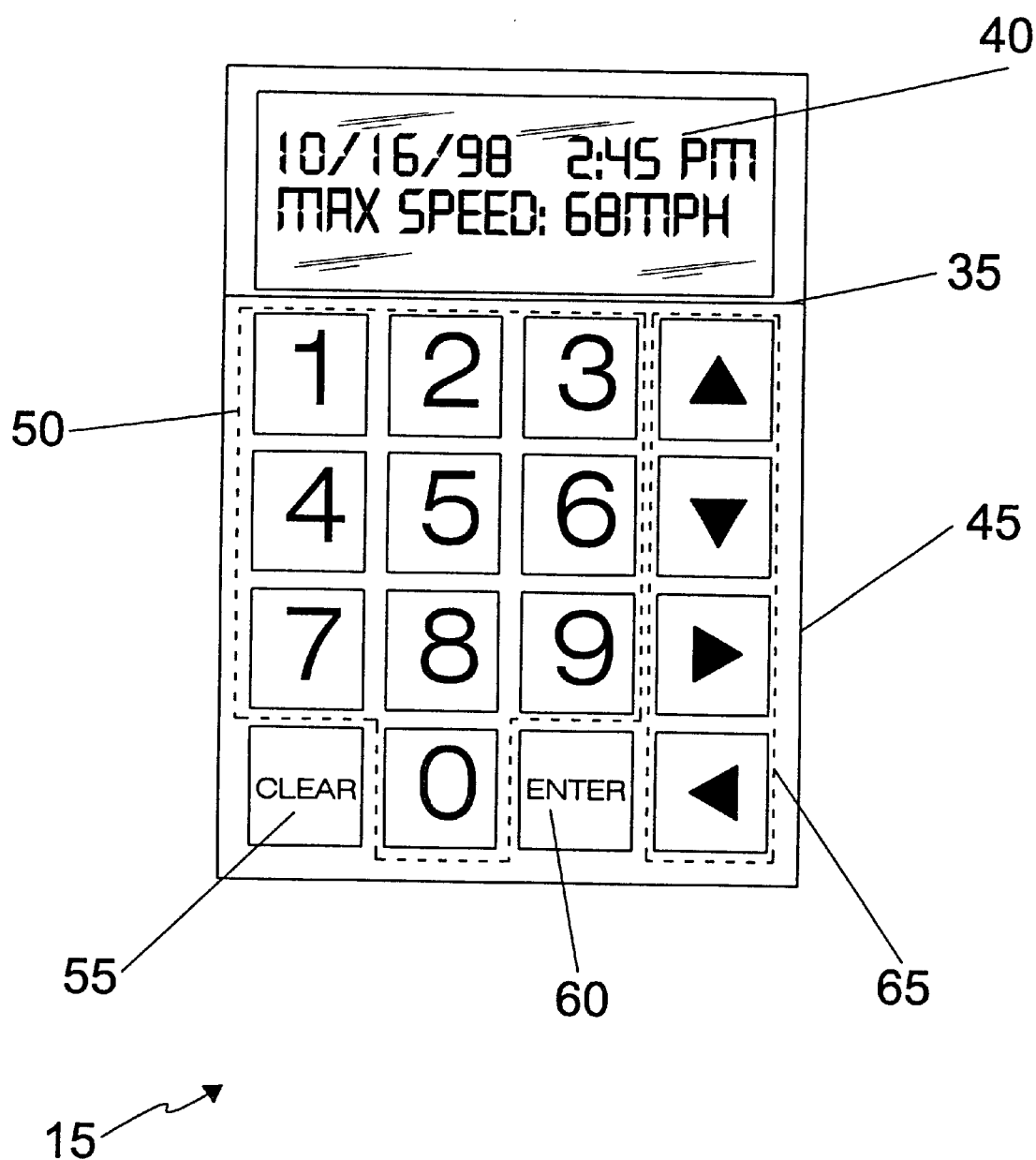
FIG. 2 is a front view of the operating panel as used with the motor vehicle speed monitoring system 10.

Referring next to FIG. 2, a front view of an operating panel 35 as seen on the face of the electronics enclosure 15 is disclosed. The operating panel 35 comprises two major components, an output display 40 and an input keypad 45. The output display 40 is a conventional alphanumeric display which is used to provide output feedback to the user. Parameters such as date, time and speed are the primary output functions, but other functions such as date setting, time setting, password interlocking, saving or erasing of data entries, resetting of the motor vehicle speed monitoring system 10 and the like are also accomplished through the output display 40. The output display 40 is protected from the aforementioned elements by a protective covering such as see-through glass or plastic. Located immediately below the output display 40 is an input keypad 45. The input keypad 45 is a conventional four by four-matrix keypad which is used to provide input by the user into the motor vehicle speed monitoring system 10. A set of numeric keys 50 is used to input numerical values such as date, time, password and the like. A clear key 55 is used to clear invalid or incorrect entries made by the numeric keys 50 in a conventional manner. An enter key 60 is then used to input the values displayed by the output display 40 into the controlling circuitry of the motor vehicle speed monitoring system 10 in a conventional manner. Finally, a set of scroll control keys 65 is used to advance or reverse the user through the various control functions of the electronics enclosure 15. Such control functions are envisioned to be, but are not limited to the following: setting of date, setting of time, enabling or disabling data acquisition, changing passwords, reviewing stored data, clearing specific data entries, setting English or metric units (miles per hour, versus kilometers per hour) and the like. Such functions are envisioned to be accessed through a fixed menu system similar in nature to that found during the setting of a digital clock or watch or that found during the setting of a conventional video cassette recorder.

Figure 3:
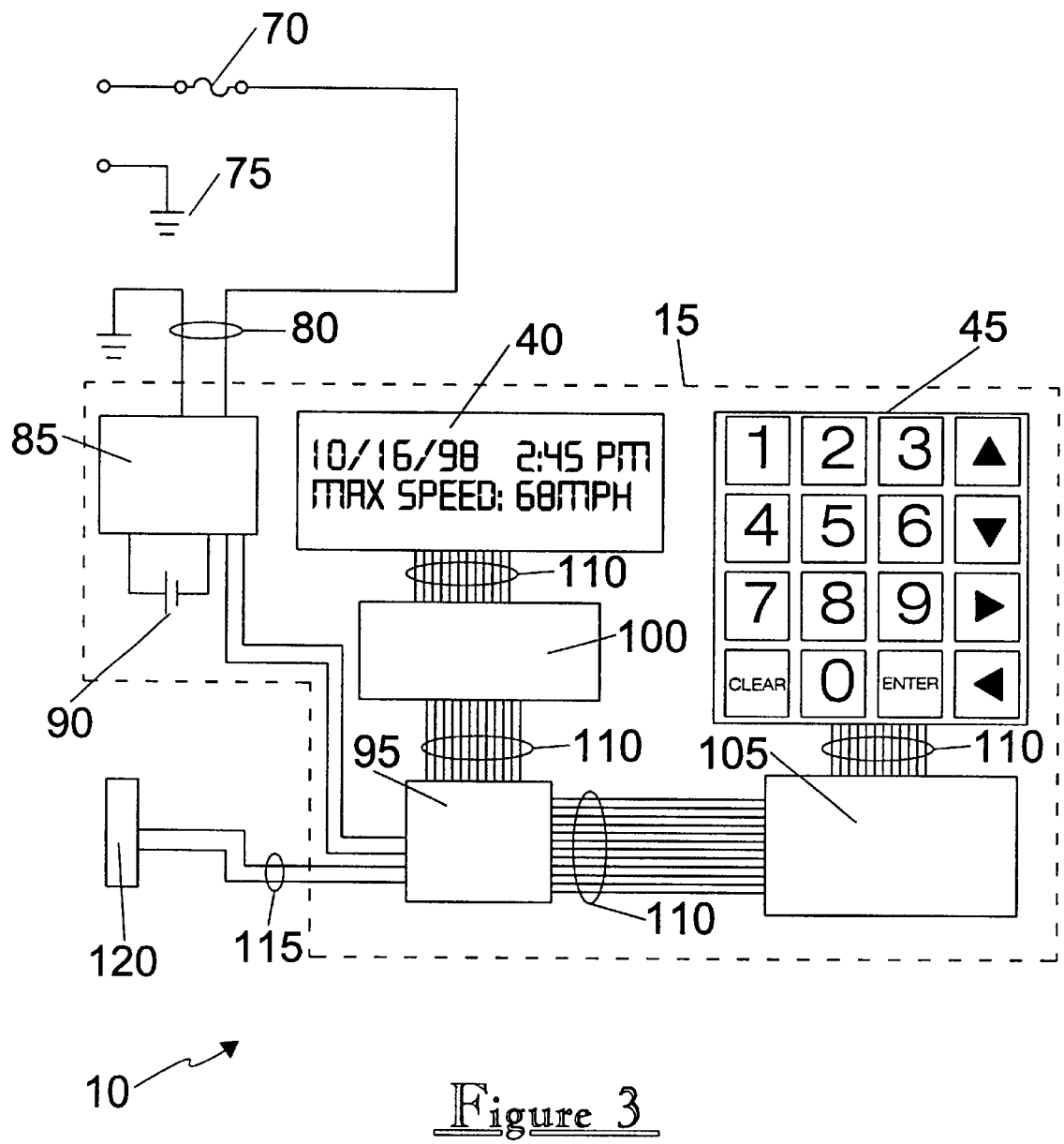
FIG. 3 is an electrical block schematic diagram of the 10.

Referring now to FIG. 3, an electrical block schematic diagram of the motor vehicle speed monitoring system 10 is disclosed. Electrical power for the motor vehicle speed monitoring system 10 is provided through a fuse 70, which provides and protects the positive direct current connection, and a ground connection 75 which provides the negative connection. A power connection cable 80 then carries this electrical power into the electronics enclosure 15 where it terminates at a power supply 85. The power supply 85 converts the 12 volts normally present in a motor vehicle electrical system into the lower levels required by solid state electrical circuits. The power supply 85 is provided with an internal backup battery 90 to allow for the retention of settings such as date, time and password, as well as acquired data such as speed in those instance where the power normally provided by the fuse 70 and the ground connection 75 is interrupted. This avoidance of interruption is important in those instances where such interruptions are accidental, such as a dead battery or those instances where it is intentional by the disconnection of the battery by users attempting to clear the motor vehicle speed monitoring system 10 of incriminating data. Power from the power supply 85 is then routed to a main processor unit 95 and then onto a display driver 100 and a keyboard interface 105. The main processor unit 95 process the internal logic that will be described in greater detail herein below and accepts input instructions from the input keypad 45 through the keyboard interface 105 and provides output instructions through the display driver 100 to the output display 40. It is envisioned that the main processor unit 95 is of the conventional type commonly available capable of being programmed in common computer language such as BASIC. Data transfer between the output display 40, the display driver 100, the main processor unit 95, the input keypad 45, and the keyboard interface 105 occur over a series of communication paths 110 and is envisioned to be on the board level and/or a combination of board level or ribbon cable connections in the case of discrete and separate components. The actual determination of speed is made through a connection of a speed acquisition cable 115 to the main processor unit 95 from a speed detection device 120. It is envisioned that the speed detection device 120 would be of the type that makes a mechanical connection to the existing motor vehicle speedometer for the determination of speed, although it can easily be seen by those familiar in the art that other methods such as hall effect technology on the drive shaft, optical detection, radar detection and other such methods could equally be used and as such should not be a limiting factor of the present invention. This FIG. clearly shows that only two external connections are required to the electronics enclosure 15, namely the power connection cable 80 and the speed acquisition cable 115 and as such allows for the ease of installation by either an automobile manufacturer on an original equipment basis or by a motor vehicle owner on an aftermarket basis.

Figure 4:
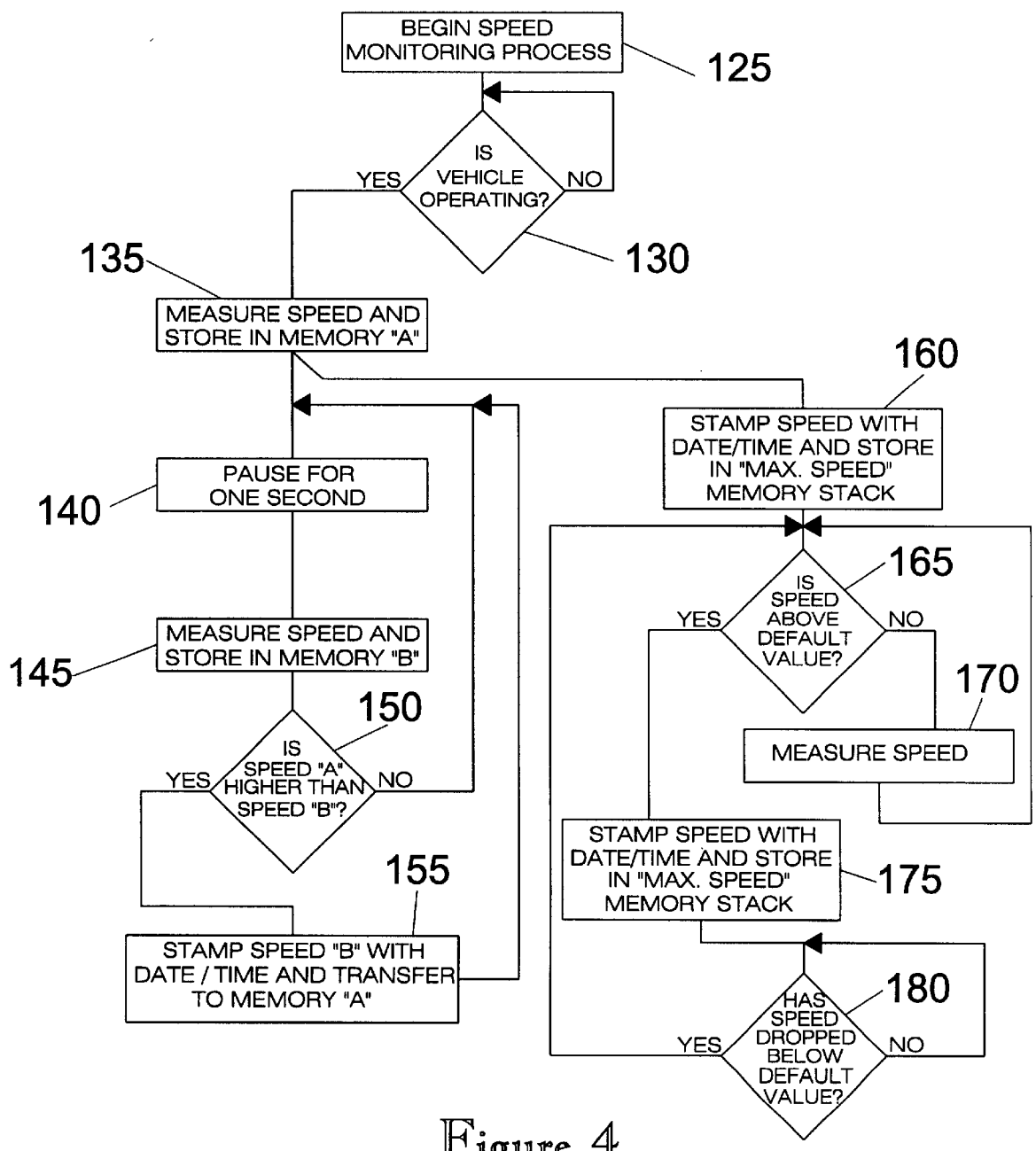
FIG. 4 is a flow chart depicting the operating logic behind the speed acquisition process as associated with the motor vehicle speed monitoring system 10.

Referring now to FIG. 4, a flow chart depicting the operating logic behind the speed acquisition process as used with the motor vehicle speed monitoring system 10 is disclosed. The flow sequence begins at a first functional block 125. The process then continues on through a first operation block 130 whereupon a negative response generates a loop configuration within the first operation block 130. A positive response directs the recording of the measured speed via a second functional block 135. The acquisition process commences pauses for one second as defined by a third functional block 140. The acquisition process then continues at a fourth functional block 145 whereupon a second speed measurement is obtained. The speed as obtained in the second functional block 135 and the speed as obtained in the fourth functional block 145 are compared in a second operation block 150. A negative response directs the process back to third functional block 140 as indicated. A positive response directs the storing of the data acquired in the second operation block 150 as well as the time and date said speed was acquired in a fifth functional block 155, and then directs the process back to the third functional block 140 in a manner similar to that mentioned with a negative response. Such a pattern continues until the motor vehicle 25 (as seen in FIG. 1) is turned off. At that point the final highest speed value as determined by the second operation block 150 is the stored value as viewed later by the authorized individual. This pattern is then continued the next time the motor vehicle 25 is operated, whereupon the process is started anew and a new highest speed value is obtained and stored. It can thus be seen that this process results in the highest speed obtained by the motor vehicle being recorded each time it is operated.

Referring finally now again to FIG. 4, a secondary flow process begins also at the second functional block 135. A sixth functional block 160 accesses the speed measurement as obtained in the second functional block 135 and stores it in a maximum speed memory stack along with a date and time stamp. The output of sixth functional block 160 then goes onto a third operational block 165 where it is determined if the speed stored in the sixth functional block 160 is above a preset default value. It is envisioned that the preset default value would be set at a factory setting of 55 miles per hour, but the final user would be capable of resetting the default value by way of the input keypad 45 (as shown in (FIG. 2). A negative response to the third operational block 165 dictates the obtaining of another speed measurement by a seventh functional block 170 and the corresponding return of logic control to the third operational block 165. A positive response to the third operational block 165 dictates the storing of the speed along with a date and time stamp in the maximum speed memory stack by an eighth functional block 175. Logic control then proceeds to a fourth operational block 180 where it is determined if the speed has dropped below the preset default value as explained in the third operational block 165. A negative response provides for the continuation of the loop until speed has dropped below the preset default value. A positive response dictates that the logic control returns to the third operational block 165. The entire process between the sixth functional block 160 and the fourth operational block 180 provides for the recording of each speed incident that exceeds the preset default value. When the speed drops below this point, the system resets and the next above speed incident is awaited. Each time the vehicle exceeds the preset default value the maximum speed is recorded. This will provide for the recording of a pattern of speeding tendencies of a driver, by the monitoring of how often and by how much a vehicle speeds.

Operation of the Preferred Embodiment

The present invention is designed with ease of operation features in mind that allow it to be used by the common user with little or no training in a transparent manner with respect to operation of a conventional motor vehicle.

To use the present invention, the user would first install the motor vehicle speed monitoring system 10 in general accordance with the schematic diagram in FIG. 3. It is envisioned that the motor vehicle speed monitoring system 10 would be available as standard equipment on new motor vehicles, thus being installed as a factory option, or be available as a retrofit aftermarket package for use on existing motor vehicles. After installation, parameters such as date, time and a password are entered into the electronics enclosure 15. Once installed and configured, the motor vehicle speed monitoring system 10 is ready for constant, automatic, uninterrupted operation.

During the operation of the motor vehicle 25 the highest speed obtained by the vehicle, each time it is turned on and moved, is recorded in general accordance with FIG. 4. This acquisition is recorded with or without the knowledge of the operator. This allows authorized individuals, such as parents, vehicle rental operators, business owners, and the like to maintain knowledge of the top speed the vehicle was operated at, in the same manner in which the knowledge of the distance the vehicle was operated is obtained via the odometer.

To gain access to the stored data within the electronics enclosure 15 of the motor vehicle speed monitoring system 10, the authorized individual access the electronics enclosure 15 at the location in which it is installed. Such locations could be the engine compartment 20, the passenger compartment 30, or other location on the motor vehicle 25. The individual would then enter the password into the numeric keys 50 of the input keypad 45 on the electronics enclosure 15 and access the functions of the motor vehicle speed monitoring system 10 as aforementioned described, through the scroll control keys 65. At this point the data is visually obtained and noted via the output display 40 and the electronics enclosure 15 is returned to the acquisition mode to repeat the above-mentioned cycle.

The foregoing description is included to illustrate the operation of the preferred embodiment and is not meant to limit the scope of the invention. The scope of the invention is to be limited only by the following claims.

What is claimed is:

1. A motor vehicle speed monitoring system for use with a motor vehicle having an engine compartment, said motor vehicle speed monitoring system comprising:

an electronics enclosure, said enclosure located within an engine compartment;

an operating panel, said operating panel positioned on a face of said electronics enclosure, said operating panel comprising an output display and an input keypad, said output display for providing output feedback and said input keypad for providing input by a user into the motor vehicle speed monitoring system;

control circuitry, allowing the recording of said motor vehicle's speed in an unattended manner, including recording the top speed of the vehicle each time the vehicle is driven and keeping a log of the speed, the time, and the date at which the top speed of the vehicle occurred, said control circuitry making an actual determination of speed through a speed detection device connected to a main processor unit by a speed acquisition cable, wherein said main processor unit is located within said electronics enclosure, and said speed detection device is mechanically connected to a vehicle speedometer for the determination of speed, wherein said control circuitry comprises:
a first functional block;
a second functional block;
a third functional block;

a first operational block, whereupon a negative response generates a loop configuration within the first operation block and a positive response directs the recording of the measured speed via a second functional block;

a fourth functional block wherein a second speed measurement is obtained, speed as obtained in the second functional block and speed as obtained in the fourth functional block are compared in a second operational block, a negative response directing process back to third functional block and a positive response directing a storing of the data acquired in the second operational block as well as the time and date said speed were acquired in a fifth functional block and then directing process back to the third functional block with a negative response until the motor vehicle is turned off, wherein a final highest speed value as determined by the second operational block is a stored value;

a sixth functional block for accessing speed measurement as obtained in the second functional block and storing said speed measurement in a maximum speed memory stack along with a date and time stamp, output of sixth functional block then communicated onto a third operational block where a determination is made if speed stored in the sixth functional block is above a preset default value; a negative response to the third operational block thereby dictating an obtaining of another speed measurement by a seventh functional block and a corresponding return of logic control to the third operational block; and, a positive response to the third operational block dictating a storing of speed along with a date and time stamp in the maximum speed memory stack by an eighth functional block;

a fourth operational block wherein a determination is made if speed has dropped below the preset default value as explained in the third operational block, a negative response providing for the continuation of the loop until speed has dropped below the preset default value and a positive response dictating that the logic control returns to the third operational block;

and wherein entire communication between the sixth functional block and the fourth operational block provides for the recording of each speed incident that exceeds the preset default value.

\* \* \* \* \*